United States Patent [19]
Michelotti

[11] Patent Number: 5,808,150
[45] Date of Patent: Sep. 15, 1998

[54] STABILIZATION OF HYDROXYLAMINE SOLUTIONS

[75] Inventor: Frank Michelotti, Easton, Pa.

[73] Assignee: Concept Sciences, Inc.

[21] Appl. No.: 910,533

[22] Filed: Aug. 14, 1997

[51] Int. Cl.$^6$ .................................................. C07C 209/90
[52] U.S. Cl. ............................... 564/2; 564/300; 564/301
[58] Field of Search ................................. 564/2, 300, 301

[56] References Cited

U.S. PATENT DOCUMENTS

| | | | |
|---|---|---|---|
| 3,145,082 | 8/1964 | Rausch et al. ............................ | 23/190 |
| 3,577,556 | 5/1971 | Longoria ..................................... | 564/2 |
| 4,602,108 | 7/1986 | McKinnie ................................... | 564/2 |
| 5,324,857 | 6/1994 | Shehad ...................................... | 564/2 |

*Primary Examiner*—Shailendra Kumar
*Attorney, Agent, or Firm*—John Lezdey

[57] ABSTRACT

The invention provides a stabilized aqueous, semi-aqueous, or non-aqueous solution of hydroxylamine or a partially neutralized hydroxylamine salt and a process therefore. The invention utilizes as a stabilizing agent a specific acetic acid compound.

15 Claims, No Drawings

STABILIZATION OF HYDROXYLAMINE SOLUTIONS

FIELD OF THE INVENTION

The present invention relates to aqueous, semi-aqueous and non-aqueous solutions of hydroxylamine or an at least partially neutralized hydroxylamine salt which are stabilized against decomposition by adding thereto specific acetic acid compounds.

BACKGROUND OF THE INVENTION

Solutions of hydroxylamine are inherently unstable, decomposing by internal oxidation-reduction to form ammonia and nitrogen or nitrogen oxides. The decomposition is accelerated by high pH and the presence of catalytic amounts of multivalent cations such as Fe (II) and Cu (II). Aqueous solutions thereof are commonly produced by at least the partial neutralization of the hydroxylamine salt, such as the hydrochloride or sulfate, with an alkali metal hydroxide or ammonia. The solutions are widely used in synthesis work, but the instability of the free hydroxylamine in these solutions limits its utility in cases where storage is necessary.

There have been a number of attempts reported to stabilize solutions of hydroxylamine or an at least partially neutralized hydroxylamine salt in order to achieve a longer shelf life. Compounds that have been reported to be stabilizers for such solutions include various chelating agents (such as the tetrasodium salt of ethylene diaminetetraacetic acid) (U.S. Pat. No. 3,145,082); amide oximes (U.S. Pat. No. 3,480,391); hydroxamic acids (U.S. Pat. No. 3,480,392); hydroxyureas and hydroxythioureas (U.S. Pat. No. 3,544,270); hydroxylalkylidene diphosphonic acids (U.S. Pat. No. 3,647,449); vicinal polyhydroxyphenols (Japanese Pat. No. 48/78099); hydroxyquinolines (Japanese Pat. No. 57/100908); 1,10-phenantholine (Japanese Pat. No. 58/69841); dipyridyl compounds (Japanese Pat. No. 58/69842); thiocarboxylic acids (Japanese Pat. No. 58/69843); quinoline derivatives (Japanese Pat. No. 58/69844); hydroxy substituted flavone (German Pat. No. 3343597); anthocyanins (U.S. Pat. No. 4,551,318); hydroxyl substituted flavan (German Pat. No. 3343599); stannic acid (Japanese Pat. No. 60/260541); hydroxy substituted anthraquinones (U.S. Pat. No. 4,576,804); 8-hydroxyquinolidines (U.S. Pat. No. 462,913); and 2-3-dihydrohexano-1,4-lactone (U.S. Pat. No. 4,634,584).

SUMMARY OF THE INVENTION

The present invention provides stabilized aqueous, semi-aqueous, or non-aqueous solutions of hydroxylamine or an at least partially neutralized hydroxylamine salt which are stable over a prolonged period, minimizing the decomposition of hydroxylamine. This is achieved by the addition of small amounts of an acetic acid compound selected from the group consisting of cis-or trans-1,2diaminocycloalkyl-N,N,$N^1$,$N^1$-tetraaceticacid, bis-hexamethylenetriamine pentaacetic acid, hexamethylenediaminetetraacetic acid, tris-(2-aminoethyl) aminehexaacetic acid, diethyltriaminepentaacetic acid; ethylenediamine-N,$N^1$-diacetic acid; ethylenebis (oxyethylenenitrilo) tetraacetic acid and iminodiacetic acid.

Advantageously, the hydroxylamine solution comprises between about 10 to 70% by weight of hydroxylamine.

It is a general object of the present invention to provide a stabilized solution of hydroxylamine or a partially neutralized hydroxylamine salt.

It is another object to provide a stabilized hydroxylamine solution which can be used in the preparation of photoresist stripping compositions which are low in undesirable cations and anions.

It is a further object of the inventor to provide a hydroxylamine solution which can be used in the preparation of pharmaceuticals.

It is yet another object of the invention to provide a process for stabilizing hydroxylamine solution.

DESCRIPTION OF THE PREFFERED EMBODIMENTS

The acetic acid compounds of the present invention which are used to stabilize aqueous, semi-aqueous, or non-aqueous solutions or hydroxylamine or at least partially neutralized hydroxylamine salt comprise an effective inhibitory amount of a compound selected from the group consisting of cis-or trans-1,2-diaminocycloalkyl-N,N,$N^1$,$N^1$-tetraacetic acid; diethylenetriaminepentaacetic acid; ethylenebis (oxyethyleneitrilo) tetraacetic acid, cis-or trans-1,4-diaminocycloalkyl-N,N,$N^1$,$N^1$-tetraacetic acid, bis-hexamethylenetriamine pentaacetic acid, hexamethylenediaminetetraacetic acid tris-(2-aminoethyl) amine-hexaacetic acid and iminodiacetic acid.

The cis-or trans-1,2-diaminocycloalkyl-N,N,$N^1$,$N^1$-tetraacetic acid can be cis-or trans 1,2-diaminocyclo-heptane-N,N,$N^1$,$N^1$-tetraacetic acid, cis-or trans-1,2-diaminocyclo-pentane-N,N,$N^1$,$N^1$-tetraacetic acid, cis-or trans-1,2-diaminocyclo-hexane-N,N,$N^1$,N-tetraacetic acid, or mixtures thereof.

The cis-or trans-1,4-diaminocycloalkyl-N,N,$N^1$,$N^1$-tetraacetic acid can be cis-or trans 1,4-diaminocyclo-heptane-N,N,$N^1$,$N^1$-tetraacetic acid, cis-or trans-1,4-diaminocyclo-pentane-N,N,$N^1$,N-tetraacetic acid, cis-or 1,4-diaminocyclo-hexane-N,N,$N^1$,$N^1$-tetraacetic acid, or mixtures thereof.

The amount of stabilizer to be used to stabilize the hydroxylamine or the at least partially neutralized hydroxylamine salt solution ranges from about 0.001 to about 0.1 percent by weight of composition. Preferably, the amount of stabilizer ranges from about 0.01 to about 0.05%, (100–500 ppm) same basis. The aqueous solutions of free hydroxylamine, i.e., fully neutralized salt, can be produced by the reaction of a salt of hydroxylamine (such as the hydrochloride, the nitrate, the acetate, the sulfate salt, etc.) with an alkali metal hydroxide (such as sodium hydroxide) or with ammonia. The concentration of the hydroxylamine or the at least partially neutralized hydroxylamine salt is usually at least about 1 weight percent of the aqueous solution and can range up to about 70% or more, but is generally in the range of from about 10 to about 70 weight percent. It is best to add the stabilizer to the hydroxylamine salt solution before its neutralization with base, but the stabilizer can also be added to the at least partially neutralized hydroxylamine salt solution and salt-free hydroxylamine solutions. The temperature during the addition being advantageously kept at from about 5 degree(s) to about 40 degree(s) C. The stabilized solutions should be stored at temperatures <40 degree(s) C., preferably <25 degree(s) C.

The decomposition of the hydroxylamine in aqueous solutions is quite rapid at above pH 7.0, i.e., in the presence of excess base, providing immediate evolution of the gaseous by-products. It is convenient to test the ability of a compound to stabilize the hydroxylamine solution by monitoring the amount of gas evolved with time. The rate of decomposition of unstabilized 50% aqueous hydroxylamine is determined by nitrogen evolution after the addition of $Fe^{3+}$ion at a concentration of about 10 ppm which decomposes the hydroxylamine at a rate of almost 2000 ml/hr. The stabilized solutions are useful in the preparation of pharmaceuticals and photoresist stripping compositions.

It has been surprisingly found that the stabilizers of the invention also provide a caging effect similar in concept and practice to crown ethers. This is due to the chemical and physical nature of the stabilizers of the present invention. When used in small amounts, the stabilizer acts as a host molecule and assumes a shape required for the formation of a complex or adduct to form a "cage" around an alkali or multivalent metal ion. This action prevents any redeposition of or multivalent alkali metal ions onto a metal or non-metal wafer substrate during stripping when used in a stripping composition. For this purpose, the stabilizers of the present invention can be used in stripper formulations independent of hydroxylamine.

The following examples are set forth for purposes of illustration only and are not to be construed as limitations on the present invention except as set forth in the appended claims. All parts and percentages are by weight unless otherwise specified.

EXAMPLE 1

(Comparative)

A suitable reaction vessel is equipped with a thermometer, a pressure equalizing funnel, a stirring bar and a gas outlet which is connected to an inverted graduated cylinder filled with water. Into the vessel are charged 39.3 parts (0.144 mole) of 30% aqueous hydroxylamine sulfate solution. While maintaining the temperature below 25 degree(s) C., 23.0 parts (0.288 mole) of 50% aqueous sodium hydroxide solution are added. The vessel is tightly sealed. Vigorous gas evolution is observed and the water is displaced from the graduated cylinder. 920 Ml of gas are evolved over a period of 4.5 hours. The gas is identified by its infrared absorption spectrum as being mainly nitrous oxide indicating the decomposition of the hydroxylamine.

EXAMPLE 2

The procedure of Example 1 is repeated except that 0.05% by weight trans-1,2-diaminocyclohexane-N,N,N$^1$,N$^1$-tetraacetic acid is added to a 50% by weight aqueous hydroxylamine solution before the addition of the sodium hydroxide. No measurable gas (<10 ml) is collected in the cylinder after 16 hours indicating that the hydroxylamine is stabilized.

EXAMPLE 3

A 50% by weight aqueous hydroxylamine solution was prepared with .05% by weight of trans-1,2-diaminocyclohexane-N,N,N$^1$,N$^1$-tetraacetic acid as the stabilizer after six days the solution had a decomposition rate of 0.63 ml/hr. This was satisfactory.

EXAMPLE 4

A 50% by weight aqueous hydroxylamine solution was prepared with a 0.05% by weight of N-(2-hydroxyethyl)-ethylenediamine triacetic acid. The solution gave a decomposition rate of decomposition of 6.64 ml/hr.

EXAMPLE 4

(Comparative)

A 50% by weight aqueous hydroxylamine solution was prepared with a 0.05% by weight of triethylenetetraamine hexaacetic acid. The solution gave a decomposition rate of about 24 ml/hr. This was unsatisfactory.

EXAMPLE 5

(Comparative)

A 50% by weight aqueous solution of hydroxylamine was prepared with 0.05% by weight of nitrotriacetic acid as the stabilizer. The solution had a decomposition rate of 78 ml/hr which was unsatisfactory.

EXAMPLE 6

(Comparative)

A solution was prepared as in Example 5 except that ethylenediamine tetraacetic acid was used as a stabilizer. The decomposition rate was unacceptable.

EXAMPLE 7

1. Into a 1 inch diameter glass column containing a stopcock was added 25 ml of Purolite CT-151 cation exchange resin. The column was flushed with 1 liter of DI water. The resin was then flushed with 1000 ml of 10% hydrochloric acid. The column was tested by inductively coupled plasma (ICP) analysis to determine if all undesirable cations are removed. The column was then flushed with DI water until the chloride ion level was <0.5 ppm.

A 5% hydroxylamine solution was poured through the column to convert the acid groups to the amino salt and there was a mild exothermic reaction. After the isotherm was complete, a 50% hydroxylamine solution was passed through the column.

2. A glass column was prepared with Purolite anion exchange resin A-400 similar to Part I. 1000 ml of 8% KOH were passed through the column and the column was then flushed with 2 liters of DI water until the K$^+$ analysis by ICP was <5 ppb. The 50% hydroxylamine solution processed was then passed through the anion exchange resin. The resulting solution was stabilized with 0.5% by weight of trans-1,2-diaminocyclohexane-N,N,N$^1$,N$^1$-tetraacetic acid. The resulting solution could be used in the preparation of a photoresist stripping composition.

EXAMPLE 8

The procedure of Example 1 is repeated except that the vessel is charged with 50 ml of a solution of dimethylacetamide containing 25 g of hydroxylamine. Then 0.05% by weight of trans-1,2-diaminocyclohexane-tetraacetic acid is added.

No measurable gas (<10 ml) is collected in the cylinder after 16 hours which indicates that the hydroxylamine has been stabilized.

What is claimed is:

1. A stabilized aqueous, semi-aqueous, or non-aqueous solution containing hydroxylamine or at least partially neutralized hydroxylamine salt and an effective decomposition inhibiting amount of a compound selected from the group consisting of cis-or trans-1,2-diaminocycloalkyl-N,N,N$^1$, N$^1$-tetraacetic acid; cis-or trans-1,4-diaminocycloalkyl-N,N, N$^1$,N$^1$-tetraacetic acid; ethylenebis (oxyethylenenitrilo) tetraacetic acid, bis-hexamethylenetriamine pentaacetic acid, hexamethylenediaminetetraacetic acid, tris (2-aminoethyl) aminehexaacetic acid, and iminodiacetic acid.

2. The stabilized solution of claim 1 wherein said acetic acid compound is trans-1,2-diaminocyclohexane-N,N,N$^1$, N$^1$-tetraacetic acid.

3. The stabilized solution of claim 1 wherein said acetic acid compound comprises at least about 0.001% by weight.

4. The stabilized solution of claim 3 wherein said acetic acid compound is present in an amount of about 0.001 to 0.1% by weight.

5. The stabilized solution of claim 1 wherein said solution is an aqueous solution of hydroxylamine.

6. The stabilized solution of claim 5 which comprises 10–70% by weight hydroxylamine.

7. The stabilized solution of claim 6 which is 50% by weight hydroxylamine.

8. A process for inhibiting the decomposition of hydroxylamine or at least partially neutralized hydroxylamine salt in an aqueous, semi-aqueous, or non-aqueous solution which comprises a stabilizing amount of a compound selected from the group consisting of cis-or trans-1,2-diaminocycloalkyl-N,N,N$^1$,N$^1$-tetraacetic acid; diethyltriaminepentaacetic acid, ethylenediamine-N,N$^1$-diacetic acid, ethylenebis (oxyethyleneitrilo) tetraacetic acid, cis-or trans-1,4 diaminocycloalkyl-N,N,N$^1$,N$^1$-tetraacetic acid, bishexamethylenetriamine, pentaacetic acid, hexamethylenediamine-tetraacetic acid, tris (2-aminoethyl) aminehexaacetic acid, and iminodiacetic acid.

9. The process of claim 8 wherein said acetic acid compound is trans-1,2-diaminocyclohexane-N,N,N$^1$,N$^1$-tetraacetic acid.

10. The process of claim 8 wherein said acetic acid is present in amount of at least about 0.005% by weight.

11. The process of claim 10 wherein said acetic acid comprises 0.1 to 0.001% by weight.

12. The process of claim 8 wherein said solution is an aqueous solution of hydroxylamine.

13. The process of claim 8 wherein said solution comprises 10–70% weight hydroxylamine.

14. The process of claim 13 wherein said solution comprises about 50% by weight hydroxylamine.

15. In a photoresist stripping composition containing a solution of hydroxylamine the improvement which consists of said hydroxylamine solution comprising the stabilized solution of claim 1.

* * * * *